United States Patent Office 3,068,183
Patented Dec. 11, 1962

3,068,183
COATING COMPOSITIONS CONTAINING STYRENE, ETHYL ACRYLATE, METHACRYLIC ACID INTERPOLYMERS
Clifford Hugh Strolle, Drexel Hill, Pa., assignor to E. I. du Pont de Nemours and Company, Wilmington, Del., a corporation of Delaware
No Drawing. Filed July 20, 1959, Ser. No. 828,005
20 Claims. (Cl. 260—21)

This application is a continuation-in-part of my copending application Serial No. 717,803, filed February 27, 1958, now abandoned.

This invention relates to novel polymers and coating compositions and more articularly to liquid coating compositions in which the essential organic film-forming material is a mixture of a novel copolymer, or interpolymer, of styrene, ethyl acrylate and methacrylic acid, in certain proportions, with an alcohol-modified urea-, melamine-, or benzoguanamine-formaldehyde condensate or a mixture of such condensates.

The invention is especially directed to baking enamels for electrical appliances such as refrigerators, freezers, washing machines and clothes driers, and for related articles such as kitchen cabinets. In this field there is a continuing search for coatings having improved properties, particularly an improved balance of properties which make the coatings unusually serviceable on such articles. These properties include hardness, flexibility, adhesion, gloss, durability, and resistance to adverse effects from abrasion (wear), grease, fumes, foods, soaps, detergents, and other chemicals, and in the case of clothes driers, exposure to high temperatures. Simultaneously, useful products of this type, in order to be acceptable to the manufacturer of the finished article must be capable of being applied by conventional methods and of being baked under industrial conditions to yield unblemished coatings; and they must be economical to use in relation to previously adopted coating compositions.

The principal objective of this invention is to provide new interpolymers and coating compositions therefrom having an improved balance of the properties required for the above-mentioned end-uses. Another objective is to provide new interpolymers and coating compositions of the baking type which are generally useful in the baked organic coating art.

The new interpolymers of this invention contain 55%–85% by weight of styrene, 5%–35% by weight of ethyl acrylate and 5%–15% by weight of methacrylic acid polymerized together in such a manner as to be compatible or miscible (admixable in a mutual solvent to yield a homogeneous solution) with urea-, melamine-, or benzoguanamine-formaldehyde-alcohol condensates of the type commonly used in baking-type enamels.

The new coating compositions of this invention are pigmented or clear (unpigmented) liquid coating compositions in which the essential organic film-forming material is a mixture of 30%–90% by weight of a new interpolymer as described above with, complementally, 70%–10% by weight of one or more urea-, melamine- or benzoguanamine-formaldehyde-alcohol condensates, the mixture being dissolved in a volatile organic solvent of the general type commonly used in the organic coating art. Well known modifiers such as curing accelerators, grinding aids, surface active agents, waxy substances and plasticizers can be present in their usual small proportions but are not required.

The products of this invention are non-aqueous, to the extent that water is not essential in the processes or products, and any which may enter with the essential ingredients is preferably kept to a minimum.

The new interpolymers (copolymers, or terpolymers) contain carefully selected proportions of styrene, ethyl acrylate, and methacrylic acid. The styrene content is 55%–85% by weight. A styrene content substantially less than 55% tends to yield undesirable levels of hardness, gloss, and water and chemical resistance in the ultimate coatings. Flexibility suffers as the styrene content increases; and, above about 85%, the ultimate coatings are too inflexible or brittle to be generally useful. At least 5% by weight of ethyl acrylate is required to plasticize the interpolymer and aid in compatibility with the urea, melamine and benzoguanamine components in the liquid coating composition. Above about 35% ethyl acrylate, there is no known advantage which compensates for the added cost. At least 5% methacrylic acid is required in the interpolymer to yield inertness and insolubility in the ultimate coatings. Above about 15% methacrylic acid, undesirably high viscosity and sometimes gelation occur in the preparation of the interpolymer, and the added cost is not offset by further advantages.

The preferred interpolymers contain 65%–75% styrene, 15%–25% ethyl acrylate and 8%–12% methacrylic acid since the coatings ultimately derived therefrom possess the optimum balance of properties in relation to cost by present standards.

The interpolymers (copolymers, or terpolymers) are prepared in general by heating a mixture of styrene, ethyl acrylate and methacrylic acid, in the indicated proportions, in the presence of about 25%–400%, based on the weight of said mixture, of an aromatic hydrocarbon solvent for the mixture at a temperature of 125°–200° C. until substantially all of the styrene, ethyl acrylate and methacrylic acid is polymerized. The time this takes is not critical, and it can vary from about one-half to eight hours under commercially practical conditions. The proportion of monomer converted to polymer is the proportion remaining after the analytical procedure of heating a thin deposit of about a one-quarter gram sample for one hour at 105° C. The proportion converted is preferably at least 95% by weight. The polymerization is preferably conducted in the presence of a normal amount, e.g. about 0.1%–2% based on the weight of said mixture, of a vinyl polymerization initiator (catalyst) for free radical polymerization which is effective in the indicated temperature range, for example ditertiarybutyl peroxide, benzaldehyde peroxide, 2,2-bis (tertiarybutylperoxy) butane, tertiarybutyl peracetate, diazoaminobenzene, or cumene hydroperoxide. Conventional polymerization adjuvants such as activators, inhibitors, surface active agents, and chain transfer agents can be present but are not required.

The polymerization is conducted under single phase (solution) polymerization conditions, i.e. both the starting materials and the resulting polymer are completely soluble in the aromatic hydrocarbon polymerization medium.

The aromatic hydrocarbon solvent can be, for example, benzene, toluene, xylene, mixtures containing such materials in major proportions, and petroleum distillate fractions of dominantly aromatic composition, such as those marketed under the trade names Velsicol Concentrate 70, Sinclair #30 Solvent, Amsco Solvent B, Panasol AN–1, Solvesso 100 and Solvesso 150. Although it is most convenient to use a solvent which refluxes at the desired polymerization temperature because this permits operating at atmospheric pressure, solvents having lower atmospheric boiling points can be used in a closed vessel under super-atmospheric pressure. The presence of solvent during polymerization permits close control of temperature, encourages reproducibility from batch to batch and yields a product having a pourable or otherwise easily handled consistency. The preferred amount of solvent present during polymerization is about 33%–100% of the total weight of styrene, ethyl acrylate and methacrylic acid.

The styrene, ethyl acrylate and methacrylic acid are preferably in substantially monomeric form, i.e. as commercial or technical grade monomers. As provided commercially, they usually contain minute amounts of polymerization inhibitors, which can be, but need not be, removed in practicing this invention.

The polymerization temperature range of 125°–200° C. used in preparing the interpolymers of this invention, and a particularly preferred range of about 140°–170° C., are substantially above the temperatures at which vinyl interpolymers for coating purposes are usually made. These higher temperatures yield products having the desired properties in the ultimate coatings and the desired compatibility in the liquid coating compositions. The preferred interpolymers, substantially freed of the solvent they are prepared in, have relative viscosities in the range of 1.07–1.17 as determined by a procedure fully described hereinafter. The interpolymers in this range are particularly adaptable to liquid coating compositions of the type involved in this invention because (1) their degree of polymerization is sufficient to provide a desirable solids content and viscosity in the liquid coating compositions, a desirable thickness of smooth coating by conventional methods of application, and desirable toughness, durability, film integrity and other physical and chemical properties in the dried coatings, and (2) their degree of polymerization is not sufficient to yield the undesirable or impractical results of gelation, insolubility in common solvents, incompatibility with the urea, melamine or benzoguanamine components of the liquid coating compositions, and uneconomical thin coatings resulting from low solids content at practical application viscosities for the liquid coating compositions.

The urea-melamine and benzoguanamine-aldehyde-alcohol condensates, also referred to herein as urea, melamine and benzoguanamine components, which are used in the coating compositions of this invention, are the type commonly used in organic baking enamels. They are prepared by well known methods involving, fundamentally, reacting urea, melamine or benzoguanamine with formaldehyde (or paraformaldehyde) and alcohol, or reacting a methylol derivative of urea, melamine or benzoguanamine with alcohol, the alcohol being a $C_1$ to $C_4$ saturated aliphatic monohydric alcohol, i.e. methanol, ethanol, propanol, or butanol, usually in excess of the amount required to etherify all of the methylol groups. Minor proportions of modifiers, particularly amino compounds, are sometimes included. Examples are polyamines and aryl sulfonamides. Also for example, urea is sometimes used to modify a melamine condensate and vice versa. A wide variety of suitable condensates of these types is readily available in the resin market usually in the form of solutions containing 50%–70% resin (condensate) in a convenient solvent. They are usually described as "coating resins" or "resins for finishes," and they are offered by several suppliers under such trade names as "Resimene," "Uformite," "Plaskon," "Beetle," "Melmac" and "Beckamine."

The organic film-forming material in the coating compositions of this invention contains an interpolymer and a urea, melamine and/or benzoguanamine component as previously described in the proportions of 30%–90% by weight of interpolymer and, complementally, 70%–10% by weight of urea, melamine and/or benzoguanamine component. The balance of properties of mixtures outside these proportions, although suitable for some coating applications, is not what is usually required of enamels for the previously described end-uses or for other baking enamel uses such as on automobiles. A preferred range of proportions, especially for electrical appliance enamels is 45%–70% of interpolymer and, complementally, 55%–30% of urea, melamine and/or benzoguanamine component.

Although some improvement in a particular property of a baking enamel may be obtained using ingredients, proportions and procedures generally like but slightly outside the limits specified above with respect to the organic film-forming components, operation within these limits is important if the optimum improvement is to be obtained. In this sense and to this extent, these limits are critical.

The pigments and solvents which are useful in the coating compositions of this invention are the kinds commonly used in organic paints, varnishes, enamels and lacquers, and they are used in the usual proportions employed in the organic coating art.

Examples of suitable pigments are metal oxides, hydroxides, chromate, silicates, sulfides, sulfates and carbonates, carbon blacks, organic dyestuffs and lakes thereof and metal flake pigments like aluminum. Since the interpolymers contain free carboxyl groups, acid-sensitive and strongly basic reacting pigments are preferably avoided. The amount of pigment is not critical. It usually is within the range of 1%–200% by weight of the total organic film-forming material present.

Suitable solvents, and diluents which can be used in admixture with solvents, include aromatic and aliphatic hydrocarbons, alcohols, ketones and esters. Mixtures of aromatic hydrocarbons, such as xylene, and aliphatic monohydric alcohols, such as butanol, are preferred. The solvent or solvent mixture, and any diluent which may be used, must be volatile to the extent that it evaporates readily from a wet coating during the subsequent baking (drying) step and leaves a dry coating. The amount of solvent, plus diluent if used, is not critical. It usually is within the range of 10%–85% of the total coating composition.

The coating compositions of this invention can be applied by any conventional method such as spraying, brushing, dipping, flowing or roller coating. Spraying is preferred. The coatings are baked by conventional methods to harden and insolubilize them and to develop the improved properties to an optimum degree. Baking times and temperatures are not critical but, in order to obtain the best results, the widely used commercial baking schedules are preferred. These range from 45–60 minutes at about 250° F. to 10–15 minutes at about 400° F. The optimum range is usually from 25–30 minutes at about 280° F. to 15–20 minutes at 350° F.

The following examples are provided to illustrated the principles and practice of this invention, but its scope is not limited to the exact details of these illustrative examples. Unless otherwise indicated, the parts and percentages are given by weight.

EXAMPLE 1

*Preparation of Interpolymer 70% Styrene/20% Ethyl Acrylate/10% Methacrylic Acid*

Parts by wt.
Aromatic hydrocarbon, boiling range 150°–190° C., aniline point —28° C. ("Solvesso" 100) _____ 2945
Styrene, commercial grade monomer _____ 4810
Ethyl acrylate, commercial grade monomer _____ 1374
Methacrylic acid, commercial grade monomer ____ 687
Ditertiarybutyl peroxide _____ 68.7
Xylol, boiling range 135°–146° C., aniline point —44° C. _____ 1636
Butanol _____ 1041

The aromatic hydrocarbon is charged into a reaction vessel equipped with a thermometer, agitator and reflux condenser and is heated to 156°–160° C. The styrene, ethyl acrylate, methacrylic acid and ditertiarybutyl peroxide are mixed well at room temperature, and the mixture is introduced into the vessel in a slow stream during a period of 3 hours at such a rate that the reaction temperature is held between 148° and 154° C. After the last of the mixture has been added, the charge is held at 150° C.–160° C. for about 90 minutes when heating is discontinued. The charge is cooled to near room temperature and the xylol and butanol are admixed therewith. The resulting solution of interpolymer contains about 55.5% solids by weight and has a Gardner-Holdt viscosity of Z–1. The interpolymer has a relative viscosity of 1.089 as determined in accordance with the following procedure.

Relative viscosity is determined first by spreading about 2–3 cc. of interpolymer solution over an area of about 3 square inches in an aluminum foil dish. Interpolymer substantially free of solvent is obtained by heating the thus-prepared sample dish in an oven at about 120° C. for 3 hours. From the resulting dry interpolymer, a solution is made containing 500 mg. of polymer in 50 ml. of ethylene dichloride. The efflux time of this solution is measured at 25° C. in accordance with ASTM D–445–53T using the solution as the "oil" in said ASTM determination. A Cannon-Fenske (modified Ostwald) viscosimeter for transparent liquids, series or size number 100, is used in accordance with Appendix A of the determination. The efflux time of a sample of the ethylene dichloride used in making said solution is likewise determined. Relative viscosity, $N_r$, of the interpolymer is calculated from the equation:

$$N_r = \frac{\text{efflux time of polymer solution}}{\text{efflux time of ethylene dichloride}}$$

PREPARATION OF ENAMEL

First portion: Parts by wt.
Titanium dioxide pigment _____ 4604
Methyl isobutyl ketone _____ 1524
Interpolymer solution as prepared above ____ 2092

Second portion:
Interpolymer solution as prepared above ____ 3140
Urea-formaldehyde-butanol condensate, 60% solids in butanol _____ 3832
Melamine-formaldehyde-methanol condensate, 60% solids in 7:1 toluene:butanol _____ 964
Butanol _____ 581

The organic film-forming materials in this enamel are present in the proportions of 50:50 interpolymer:total urea and melamine condensates, or 50:40:10 interpolymer:urea condensate:melamine condensate.

The enamel is prepared by grinding the ingredients of the first portion by the sand grinding process of U.S. Patent 2,581,414 until a smooth uniform dispersion is obtained and then admixing therewith the ingredients of the second portion.

The resulting enamel is particularly useful as a topcoat for refrigerator cabinets. It is tested for this use by thinning 3 pints of the enamel to spraying consistency by admixing therewith 1 pint of a thinner (solvent mixture) containing 50% by weight of the same aromatic hydrocarbon in which the interpolymer was prepared, 45% of diacetone alcohol and 5% of pine oil. The resulting thinned enamel is sprayed in an industrial manner on primed steel refrigerator cabinet panels in such an amount as to yield complete and continuous coatings having a dry thickness of about 1 mil. The thus coated panels are then baked for 30 minutes at 300° F. After cooling to room temperature, the enamel on these panels is tested in comparison with a representative commercially-used refrigerator enamel based on a mixture of alkyd resin, urea-formaldehyde-alcohol condensate and melamine-formaldehyde-alcohol condensate. The new enamel of this example is superior in hardness, abrasion resistance and resistance to discoloration and/or deterioration from grease, alkaline soaps and detergents, foods, kitchen fumes and heat. The new enamel is substantially equal to the prior art enamel in appearance, flexibility, impact resistance and protective properties in salt-spray and high temperature/high humidity tests.

EXAMPLES 2, 3, 4

Three enamels which are particularly useful as topcoats for clothes washer or drier cabinets are prepared, first, by grinding the following components in conventional paint grinding apparatus until a smooth uniform dispersion is obtained:

Parts by wt.
Titanium dioxide pigment _____ 336
Xylol _____ 111
Interpolymer solution of Example 1 _____ 153

The resulting dispersion is converted into enamel in accordance with the following formulas by admixing the remaining components:

|  | Ex. 2 | Ex. 3 | Ex. 4 |
|---|---|---|---|
| Dispersion prepared directly above | 600 | 600 | 600 |
| Interpolymer solution of Example 1 | 278 | 350 | 422 |
| Melamine-formaldehyde-butanol condensate, 50% solids in 5:1 butanol:xylene | 237 | 158 | -------- |
| Melamine-formaldehyde-methanol condensate, 60% solids in 7:1 toluene:butanol | 66 | 66 | 132 |
| Proportions: |  |  |  |
| Interpolymer | 60 | 70 | 80 |
| Melamine component: |  |  |  |
| Butanol condensate | (30) | (20) | -------- |
| Methanol condensate | (10) | (10) | (20) |
| Total | 40 | 30 | 20 |

The resulting enamels are thinned for spraying by admixing 1 pint of methyl isobutyl ketone with 4 pints of enamel. Each enamel is sprayed on several primed steel panels in such an amount as to yield complete and continuous coatings having a dry thickness of about 1.5 mils. The thus coated panels are then baked for 30 minutes at 350° F.

The properties of the resulting coatings are substantially the same as those of the product of Example 1 except for alkali resistance. In this property, the product of Example 2 is somewhat better than the others, Example 3 is second best and Examples 4 and 1 are in third place, being about equal to each other.

EXAMPLE 5

Preparation of Interpolymer 55% Styrene/35% Ethyl Acrylate/10% Methacrylic Acid

Parts by wt.
Aromatic hydrocarbon, boiling range 189°–219° C., aniline point —28° C. ("Solvesso" 150) _____ 3210
Styrene _____ 4125
Ethyl acrylate _____ 2625
Methacrylic acid _____ 750
Benzaldehyde peroxide _____ 75
Xylol _____ 1840

The aromatic hydrocarbon is charged into a reaction vessel equipped with a thermometer, agitator and reflux condenser and is heated to 190° C. The styrene, ethyl acrylate, methacrylic acid, and benzaldehyde peroxide are mixed well at room temperature, and the mixture is introduced into the vessel in a slow stream during a period of 4 hours at such a rate that the reaction temperature progressively decreases from 190° to the range of 150°–160° C. where it is held for about 90 minutes after the last of the mixture has been added. Heating is discontinued, the charge is cooled to a temperature below 135° C., and the xylol is mixed in. The resulting solution of interpoylmer contains about 60% solids by weight. The interpolymer has a relative viscosity of about 1.16.

The resulting solution is converted into a clear coating composition by mixing it with a urea-formaldehyde-alcohol resin solution in accordance with the following formula.

| | Parts by wt. |
|---|---|
| Interpolymer solution of this example | 667 |
| Urea-formaldehyde-butanol condensate, 60% solids in butanol | 1000 |
| Proportions: | |
| Interpolymer | 40 |
| Urea component | 60 |

The thus prepared clear coating composition is applied to clean polished chrome plate, aluminum and brass by thinning with a mixture of xylol and butanol for application by dipping and, after application, baking the coated articles for 25 minutes at about 280° F. Clear, glossy, smooth, adherent coatings are obtained, and these coatings have excellent resistance to discoloration and deterioration when exposed to grease, food, kitchen fumes, soap and heat.

The utility of the composition defined in the formula immediately above is not limited to clear coatings since it can be pigmented with conventional pigments in the usual proportions and in the usual manner. Likewise the clear, unpigmented coatings of this invention are not limited to the particular interpolymer or urea component used in this example or to the specific proportions employed in this example. Clear coating compositions of this invention can be prepared by employing the various interpolymers and urea, melamine and/or benzoguanamine components in the proportions previously defined, without pigment.

EXAMPLE 6

*Preparation of Interpolymer 72% Styrene/20% Ethyl Acrylate/8% Methacrylic Acid*

| | Parts by wt. |
|---|---|
| Aromatic hydrocarbon, boiling range 150°–190° C., aniline point −28° C. | 3210 |
| Styrene | 5400 |
| Ethyl acrylate | 1500 |
| Methacrylic acid | 600 |
| Ditertiarybutyl peroxide | 75 |
| Xylene | 1840 |

The interpolymer solution is prepared as in Example 1 with the single exception that the holding period after the first five ingredients have all been charged is one hour instead of the 90 minute period prescribed in Example 1. The resulting solution of interpolymer contains about 60% solids by weight. The interpolymer has a relative viscosity of about 1.12.

PREPARATION OF ENAMEL

| | Parts by wt. |
|---|---|
| First portion: | |
| Titanium dioxide pigment | 468.8 |
| Xylene | 103.8 |
| Interpolymer solution of this example | 66.8 |
| Urea-formaldehyde-butanol condensate, 60% solids in butanol | 145.6 |
| Butanol | 20.0 |
| Second portion: | |
| Interpolymer solution of this example | 520.0 |
| Urea-formaldehyde-butanol condensate, 60% solids in butanol | 240.0 |
| Proportions: | |
| Interpolymer | 60 |
| Urea component | 40 |

The enamel is prepared as in Example 1.

Coatings of the resulting enamel, prepared and baked as in Example 1 have substantially the same characteristics as coatings of the enamel of Example 1 but are not quite so hard.

EXAMPLE 7

This is an example of an enamel of this invention which, except for replacing about 25% of the urea component with a melamine component, is made on the same formula as Example 6.

| | Parts by wt. |
|---|---|
| First portion, as in Example 6. | |
| Second portion: | |
| Interpolymer solution of Example 6 | 520 |
| Urea-formaldehyde-butanol condensate, 60% solids in butanol | 150 |
| Melamine-formaldehyde-methanol condensate, 60% solids in 7:1 toluene:butanol | 100 |
| Proportions: | |
| Interpolymer | 60 |
| Urea component | 30 |
| Melamine component | 10 |

The following Examples 8–10 relate to enamels of this invention in which film-forming material having a plasticizing effect on the final coating is included in addition to the interpolymer and the urea, melamine or benzoguanamine component. Although these examples use castor oil as the added plasticizer, other well known plasticizers for coatings can be used, such as raw and blown glyceride oils, glyceride oil modified polyesters, glycerides of ricinoleic acid, the conventional plasticizing esters of phthalic, sebacic and benzoic acids, and the higher fatty acid amides in the normal proportions from about 2% to 30% by weight of the total content of plasticizer, terpolymer and urea, melamine and/or benzoguanamine component.

EXAMPLE 8

An enamel of this invention having the following formula is prepared by grinding the ingredients of the first portion until a smooth dispersion is obtained and then admixing therewith the ingredients of the second portion.

| | Parts by wt. |
|---|---|
| First portion: | |
| Titanium dioxide pigment | 204.7 |
| Aromatic hydrocarbon ("Solvesso" 100) | 39.2 |
| Xylol | 42.1 |
| Interpolymer solution of Example 1 | 72.8 |
| Second portion: | |
| Interpolymer solution of Example 1 | 198.0 |
| Castor oil, crystal grade | 60.0 |
| Melamine-formaldehyde-butanol condensate, 50% solids in 5:1 butanol:zylene | 162.3 |
| Proportions: | |
| Interpolymer | 50 |
| Melamine component | 30 |
| Plasticizer | 20 |

This enamel is particularly useful as a topcoat for automobile bodies. It is thinned, sprayed on primed autobody steel and baked 30 minutes at 250° F. in the general manner described hereinbefore.

EXAMPLES 9 AND 10

Enamels having the following formulas are prepared as described in Example 1:

| | Ex. 9 | Ex. 10 |
|---|---|---|
| First Portion: | | |
| Titanium dioxide pigment | 301.2 | 301.2 |
| Butanol | 37.2 | 37.2 |
| Diacetone alcohol | 23.6 | 23.6 |
| Aromatic hydrocarbon ("Solvesso" 100) | 43.7 | 43.7 |
| Interpolymer solution as in Example 1, substituting xylol for "Solvesso" 100 in preparation | 96.3 | 96.3 |
| Second Portion: | | |
| Interpolymer solution as in first portion | 145.0 | 175.6 |
| Benzoguanamine-formaldehyde-butanol condensate, 66% solids in butanol | 203.0 | |
| Urea-formaldehyde-butanol condensate, 60% solids in butanol | | 201.0 |
| Melamine-formaldehyde-methanol condensate, 60% solids in 7:1 toluene:butanol | | 50.2 |
| Blown castor oil, pale | 67.0 | 33.5 |
| Flow control agent, 1% polydimethylsiloxane in xylol | 3.0 | 3.0 |
| Xylol | 99.0 | 53.9 |
| Proportions: | | |
| Interpolymer | 40 | 45 |
| Benzoguanamine component | 40 | |
| Urea component | | 36 |
| Melamine component | | 9 |
| Plasticizer | 20 | 10 |

Both of these enamels are useful on such articles as refrigerator cabinets. The enamel of Example 9 can be used without the conventional first coat of primer on the metal. Both enamels are somewhat better in flexibility than similar enamels not containing plasticizer, e.g. the product of Example 1.

The following Examples 11–14 provide formulas for further interpolymers of this invention for use in coating compositions in the manner and in the proportions described hereinbefore.

EXAMPLE 11

*Interpolymer 70% Styrene/20% Ethyl Acrylate/10% Methacrylic Acid*

| | Parts by wt. |
|---|---|
| Xylene | 5622 |
| Styrene | 4810 |
| Ethyl acrylate | 1374 |
| Methacrylic acid | 687 |

Prepare by carefully heating all of the ingredients under autogenous pressure in a closed vessel equipped with a thermometer and an agitator, to 175°–180° C. and holding this reaction temperature for 90 minutes.

EXAMPLE 12

*Interpolymer 77% Styrene/13% Ethyl Acrylate/10% Methacrylic Acid*

| | Parts by wt. |
|---|---|
| Aromatic hydrocarbon, boiling range 158°–208° C., aniline point —5° C. (Sinclair #30 Solvent) | 3210 |
| Styrene | 5775 |
| Ethyl acrylate | 975 |
| Methacrylic acid | 750 |
| Cumene hydroperoxide | 49 |
| Xylol | 1820 |

Prepare by the procedure of Example 1.

EXAMPLE 13

*Interpolymer 85% Styrene/10% Ethyl Acrylate/5% Methacrylic Acid*

| | Parts by wt. |
|---|---|
| Xylene | 1473 |
| Toluene | 3723 |
| Styrene | 2925 |
| Ethyl acrylate | 344 |
| Methacrylic acid | 172 |
| Ditertiarybutyl peroxide | 51 |

Prepare by carefully heating all of the ingredients, under autogenous pressure in a closed vessel equipped with a thermometer and an agitator, to 145°–150° C. and holding this reaction temperature for 90 minutes.

EXAMPLE 14

*Interpolymer 80% Styrene/5% Ethyl Acrylate/15% Methacrylic Acid*

| | Parts by wt. |
|---|---|
| Aromatic hydrocarbon, boiling range 150°–190° C., aniline point —28° C. | 1515.0 |
| Styrene | 2824.0 |
| Ethyl acrylate | 176.5 |
| Methacrylic acid | 529.5 |
| Ditertiarybutyl peroxide | 52.9 |
| Xylene | 872.0 |

Prepare by the procedure of Example 1.

The foregoing examples have been given for clearness of understanding only, and no unnecessary limitations of the invention are to be interpreted therefrom. Obvious modifications will appear to persons skilled in the interpolymer and organic coating arts. The invention is not intended to be limited except as defined in the appended claims.

I claim:
1. An interpolymer of 55%–85% by weight of styrene, 5%–35% by weight of ethyl acrylate and 5%–15% by weight of methacrylic acid prepared by heating, in a nonaqueous single phase polymerization medium, a mixture of styrene, ethyl acrylate and methacrylic acid within said proportions in solution in about 25%–400%, based on the weight of said mixture, of aromatic hydrocarbon solvent for both said mixture and said interpolymer at a temperature of 125°–200° C. until substantially all of said styrene, ethyl acrylate and methacrylic acid is polymerized, any polymerization initiator present being an initiator for free radical polymerization.

2. An interpolymer of claim 1 in which the styrene, ethyl acrylate and methacrylic acid are present in the weight proportions of 65%–75% styrene, 15%–25% ethyl acrylate and 8%–12% methacrylic acid.

3. An interpolymer of claim 1 in which the styrene, ethyl acrylate and methacrylic acid are present in the weight proportions of 70% styrene, 20% ethyl acrylate and 10% methacrylic acid.

4. An interpolymer of claim 1 in which the styrene, ethyl acrylate and methacrylic acid are present in the weight proportions of 55% styrene, 35% ethyl acrylate and 10% methacrylic acid.

5. An interpolymer of claim 1 in which the styrene, ethyl acrylate and methacrylic acid are present in the weight proportions of 72% styrene, 20% ethyl acrylate and 8% methacrylic acid.

6. An interpolymer of claim 1 in which the styrene, ethyl acrylate and methacrylic acid are present in the weight proportions of 77% styrene, 13% ethyl acrylate and 10% methacrylic acid.

7. An interpolymer of claim 1 in which the styrene, ethyl acrylate and methacrylic acid are present in the weight proportions of 85% styrene, 10% ethyl acrylate and 5% methacrylic acid.

8. An interpolymer of claim 1 in which the styrene, ethyl acrylate and methacrylic acid are present in the weight proportions of 80% styrene, 5% ethyl acrylate and 15% methacrylic acid.

9. An interpolymer of claim 1 prepared in the presence of said aromatic hydrocarbon solvent in the amount of about 33%–100% based on the weight of said mixture.

10. An interpolymer of claim 1 prepared at a temperature about 140°–170° C.

11. An interpolymer of claim 1 prepared in the presence of a vinyl polymerization initiator selected from the class consisting of peroxy and azo initiators.

12. An interpolymer of claim 1 having a relative viscosity in the range of 1.07–1.17.

13. A liquid coating composition comprising, as the essential organic film-forming material, a compatible mixture of (1) 30%–90% by weight of an interpolymer of claim 1 and (2) 70%–10% of a member of the class consisting of urea-formaldehyde-monohydric alcohol condensates, melamine - formaldehyde - monohydric alcohol condensates, benzoguanamine-formaldehyde-monohydric alcohol condensates, and mixtures thereof; said film-forming material being in solution in volatile organic solvent therefor.

14. A coating composition of claim 13 in which (1) and (2) are present in the proportions of 45%–70% and 55%–30% respectively.

15. A coating composition of claim 13 further containing pigment.

16. A coating composition of claim 13 further containing plasticizer in the proportion of 2%–30% by weight of the total of (1), (2) and said plasticizer.

17. A coating composition of claim 16 in which said plasticizer is a member of the class consisting of castor oil and blown castor oil.

18. A liquid coating composition consisting essentially of pigment and a mixture of 50% by weight of the interpolymer of claim 3, 40% by weight of urea-formaldehyde-butanol condensate, and 10% by weight of melamine-formaldehyde-methanol condensate, said mixture being in solution in volatile organic solvent therefor.

19. A liquid coating composition consisting essentially of pigment and a mixture of 45% by weight of the interpolymer of claim 3, 36% by weight of urea-formaldehyde-butanol condensate, 9% by weight of melamine-formaldehyde-methanol condensate, and 10% by weight of blown castor oil, said mixture being in solution in volatile organic solvent therefor.

20. A liquid coating composition consisting essentially of pigment and a mixture of 40% by weight of the interpolymer of claim 3, 40% by weight of benzoguanamine-formaldehyde-butanol condensate, and 20% by weight of blown castor oil, said mixture being in solution in volatile organic solvent therefor.

References Cited in the file of this patent

UNITED STATES PATENTS

| | | |
|---|---|---|
| 2,536,050 | Fluck | Jan. 2, 1951 |
| 2,606,165 | Chapin et al. | Aug. 5, 1952 |
| 2,681,897 | Frazier et al. | June 22, 1954 |
| 2,873,202 | Chapman | Feb. 10, 1959 |
| 2,899,404 | Chapin et al. | Aug. 11, 1959 |
| 2,918,391 | Hornibrook | Dec. 22, 1959 |
| 2,958,673 | Jen | Nov. 1, 1960 |